US012208632B2

(12) United States Patent
Niwano

(10) Patent No.: US 12,208,632 B2
(45) Date of Patent: Jan. 28, 2025

(54) PRINTING DEVICE HAVING A HOLDER

(71) Applicant: CASIO COMPUTER CO., LTD., Tokyo (JP)

(72) Inventor: Harumi Niwano, Akiruno (JP)

(73) Assignee: CASIO COMPUTER CO., LTD., Tokyo (JP)

(*) Notice: Subject to any disclaimer, the term of this patent is extended or adjusted under 35 U.S.C. 154(b) by 120 days.

(21) Appl. No.: 18/084,212

(22) Filed: Dec. 19, 2022

(65) Prior Publication Data

US 2023/0191801 A1 Jun. 22, 2023

(30) Foreign Application Priority Data

Dec. 21, 2021 (JP) ................................ 2021-206573

(51) Int. Cl.
*B41J 3/407* (2006.01)
*A45D 29/00* (2006.01)

(52) U.S. Cl.
CPC ............ *B41J 3/4073* (2013.01); *B41J 3/407* (2013.01); *B41J 3/40731* (2020.08); *A45D 29/00* (2013.01); *A45D 2029/005* (2013.01)

(58) Field of Classification Search
CPC ...... B41J 3/4073; B41J 3/407; B41J 3/40731; A45D 29/00; A45D 2029/005
See application file for complete search history.

(56) References Cited

U.S. PATENT DOCUMENTS

| | | | | |
|---|---|---|---|---|
| 2014/0132968 A1* | 5/2014 | Bitoh | A45D 29/00 358/1.6 |
| 2017/0273433 A1* | 9/2017 | Hori | A45D 34/04 |
| 2018/0001661 A1* | 1/2018 | Shimizu | B41J 29/06 |
| 2020/0276822 A1* | 9/2020 | Kimura | B41J 29/38 |
| 2023/0166531 A1* | 6/2023 | Tani | B41J 3/40731 347/104 |

FOREIGN PATENT DOCUMENTS

| | | |
|---|---|---|
| JP | 2012-152410 A | 8/2012 |
| JP | 2017-113345 A | 6/2017 |
| JP | 2020-031670 A | 3/2020 |
| JP | 2023-091793 A | 7/2023 |

OTHER PUBLICATIONS

JPO; Application No. 2021-206573; Notice of Reasons for Refusal dated Nov. 7, 2023.
JPO; Application No. 2023-212788; Notice of Reasons for Refusal dated Aug. 20, 2024.

* cited by examiner

*Primary Examiner* — Henok D Legesse
(74) *Attorney, Agent, or Firm* — Fitch, Even, Tabin & Flannery LLP

(57) ABSTRACT

Disclosed is a printing device including: a rest on which a finger corresponding to a nail to be printed is placed; and a holder which is movable to at least a first position and a second position. The first position is a position where a movement of the finger placed on the rest is restricted, and the second position is a position where a distance to the rest is larger than the first position and restriction on the finger is removed.

17 Claims, 6 Drawing Sheets

PRINTING DEVICE HAVING A HOLDER

CROSS-REFERENCE TO RELATED APPLICATION

This application is based upon and claims the benefit of priority from the prior Japanese Patent Application No. 2021-206573, filed on Dec. 21, 2021, the entire contents of which including description, claims, and drawings is incorporated herein by reference in its entirety.

BACKGROUND

Technical Field

The present disclosure relates to a printing device.

Background Art

Conventionally, printing devices (nail printers) which print designs on fingernails are known. In nail printers, the finger corresponding to the nail to be printed is placed on a finger stage, and the printing process is performed on the nail by using the inkjet method, for example.

When the nail printing is performed, if the finger corresponding to the nail to be printed moves in the middle of the process, it is impossible to print with high accuracy.

In this respect, for example, JP 2020-031670 A describes a nail printer which fixes the finger corresponding to the nail on which printing is to be performed by sandwiching the finger between the placement plate (rest) and the hold-down plate (holder) provided above the finger.

The printing quality can be maintained if the nail can be printed with the finger properly fixed.

SUMMARY

According to an aspect of the present disclosure, there is provided a printing device including: a rest on which a finger corresponding to a nail to be printed is placed; and a holder which is movable to at least a first position and a second position, wherein the first position is a position where a movement of the finger placed on the rest is restricted, and the second position is a position where a distance to the rest is larger than the first position and restriction on the finger is removed.

BRIEF DESCRIPTION OF THE DRAWINGS

The accompanying drawings are not intended as a definition of the limits of the disclosure but illustrate embodiments of the disclosure, and together with the general description given above and the detailed description of the embodiments given below, serve to explain the principles of the disclosure, wherein.

DESCRIPTION OF EMBODIMENTS

Hereinafter, an embodiment of the printing device according to the present disclosure will be described with reference to FIGS. 1 to 5. The embodiment described below is provided with various limitations technically preferable for carrying out the present disclosure. However, the scope of the present disclosure is not limited to the embodiment below or illustrated examples.

The following description takes, as an example, the printing device which performs printing on printing targets such as fingernails of hands. However, the printing target of the printing device in the present disclosure is not limited to the fingernails of hands. The printing target may be toenails of feet, for example.

Figure 1:
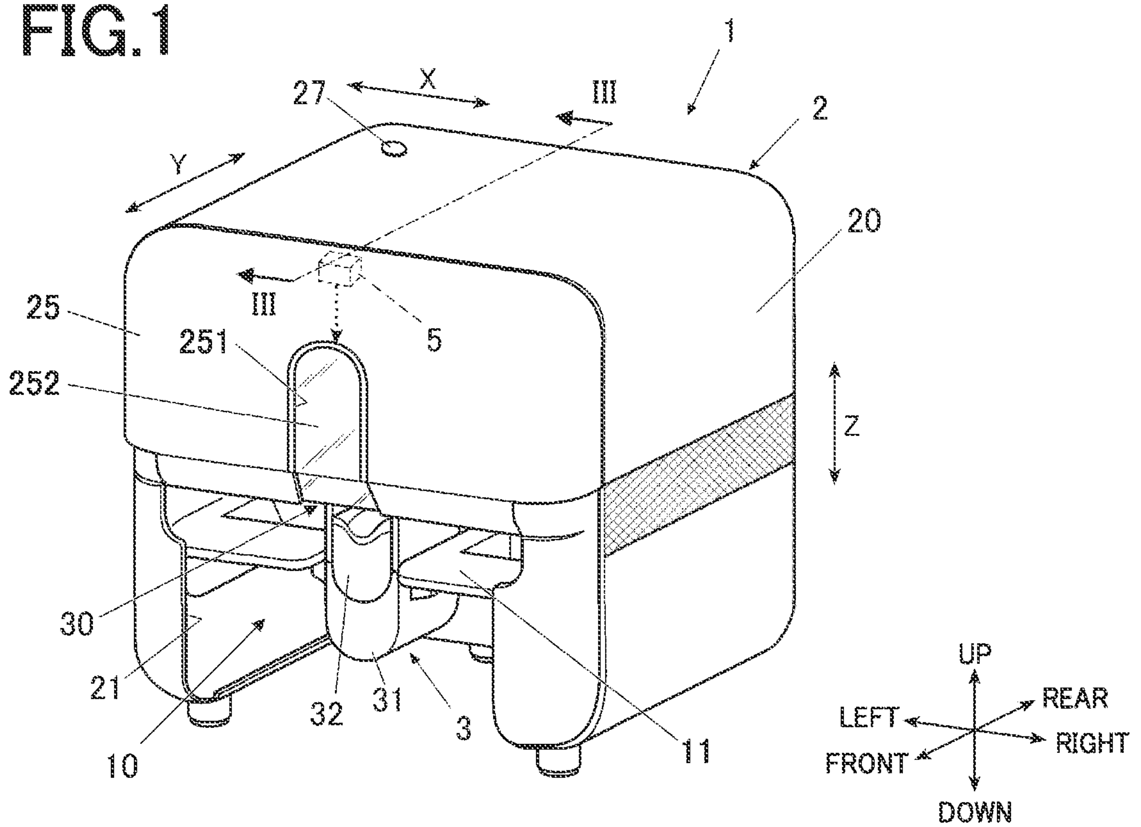
FIG. 1 is a main part perspective view showing the external configuration of a printing device in an embodiment, showing the state in which the front cover is closed.
Figure 2:
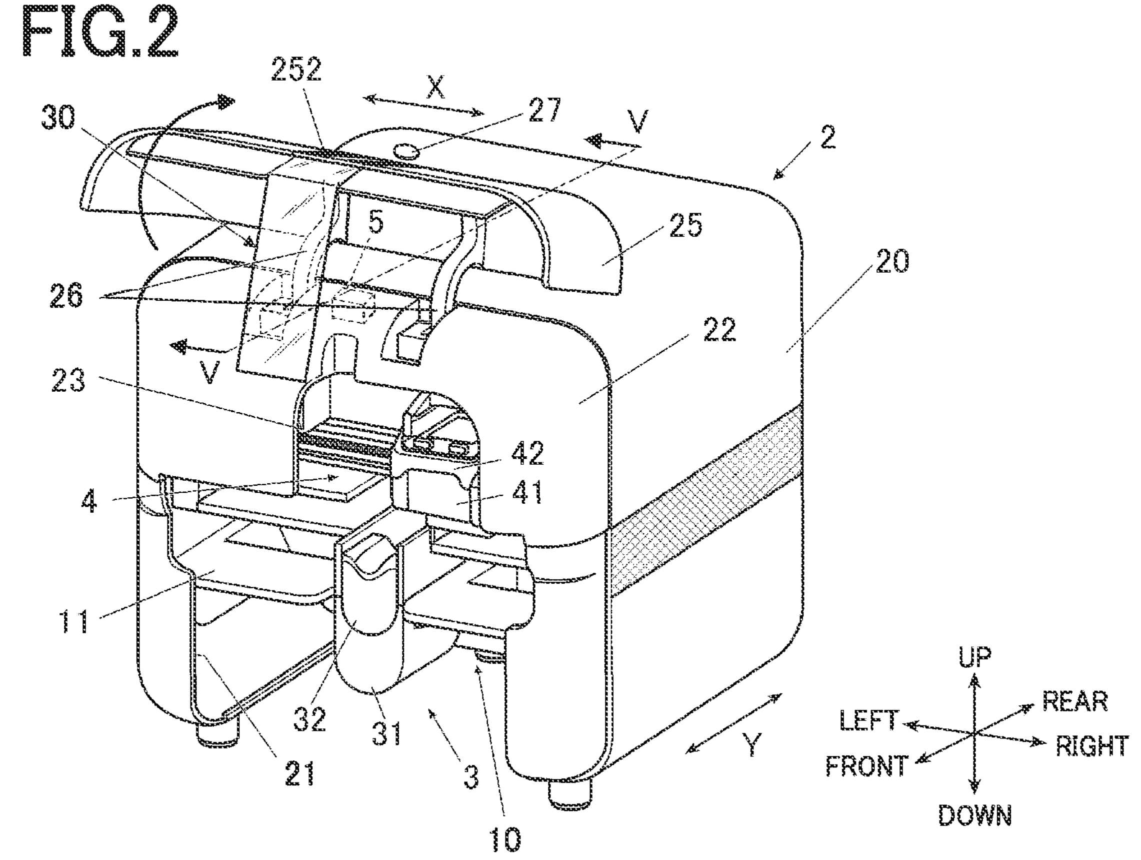
FIG. 2 is a main part perspective view showing the external configuration of the printing device in the embodiment, showing the state in which the front cover is open.

FIGS. 1 and 2 are perspective views each showing the main part external configuration of the printing device in the embodiment. FIG. 1 shows the state in which the front cover is closed. FIG. 2 shows the state in which the front cover is open.

Figure 3:
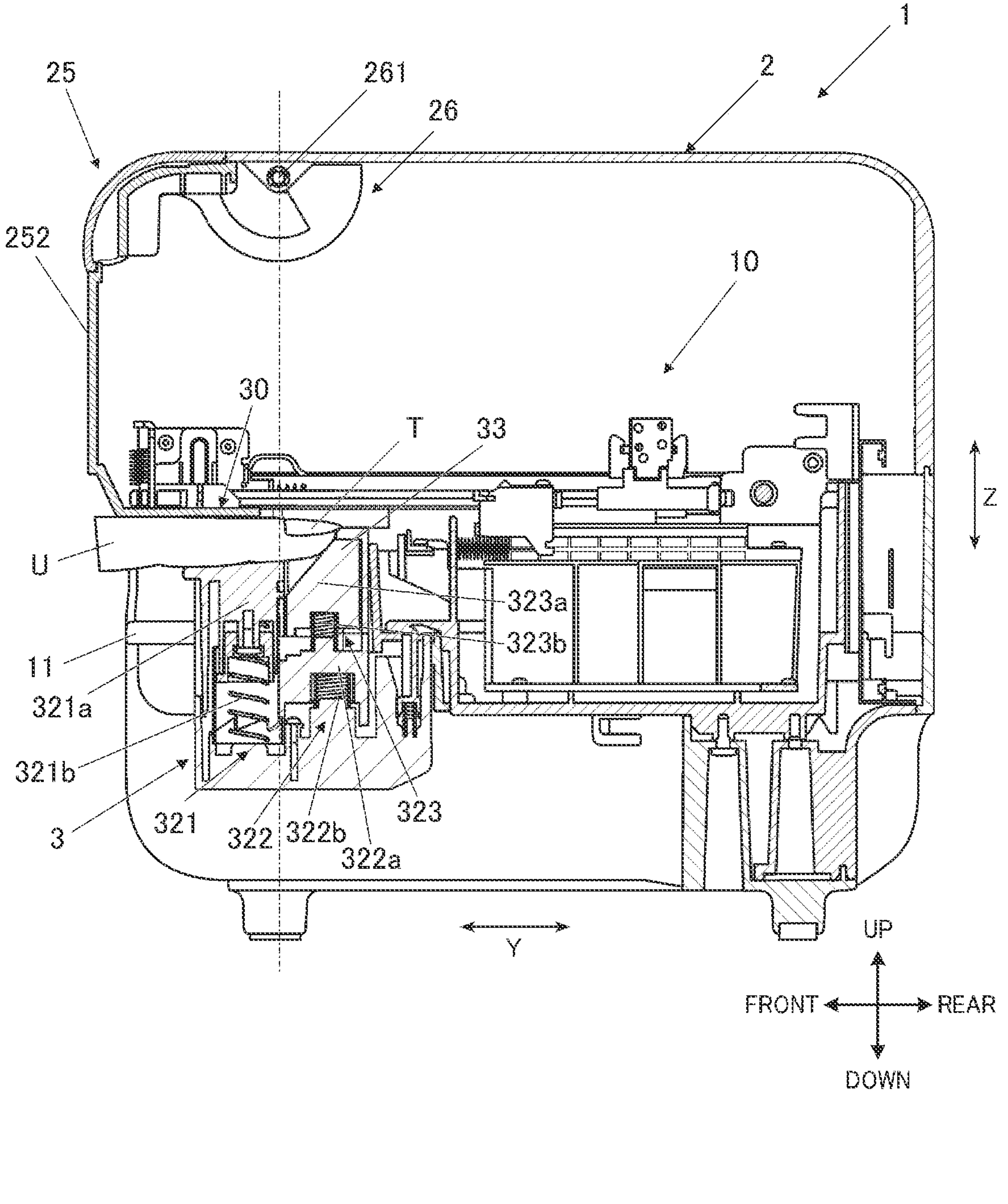
FIG. 3 is a cross-sectional view along the III-III line of the printing device in the closed state shown in FIG. 1.
Figure 4:
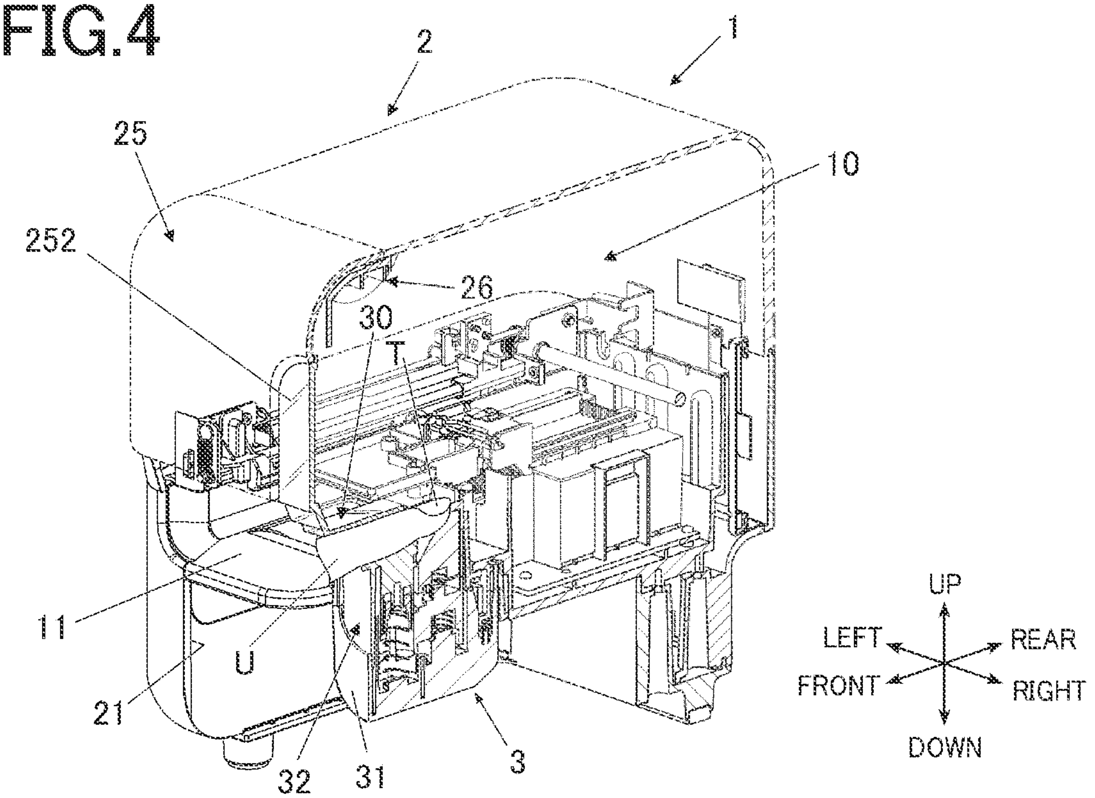
FIG. 4 is a cross-sectional perspective view along the III-III line of the printing device in the closed state shown in FIG. 1.
Figure 5:
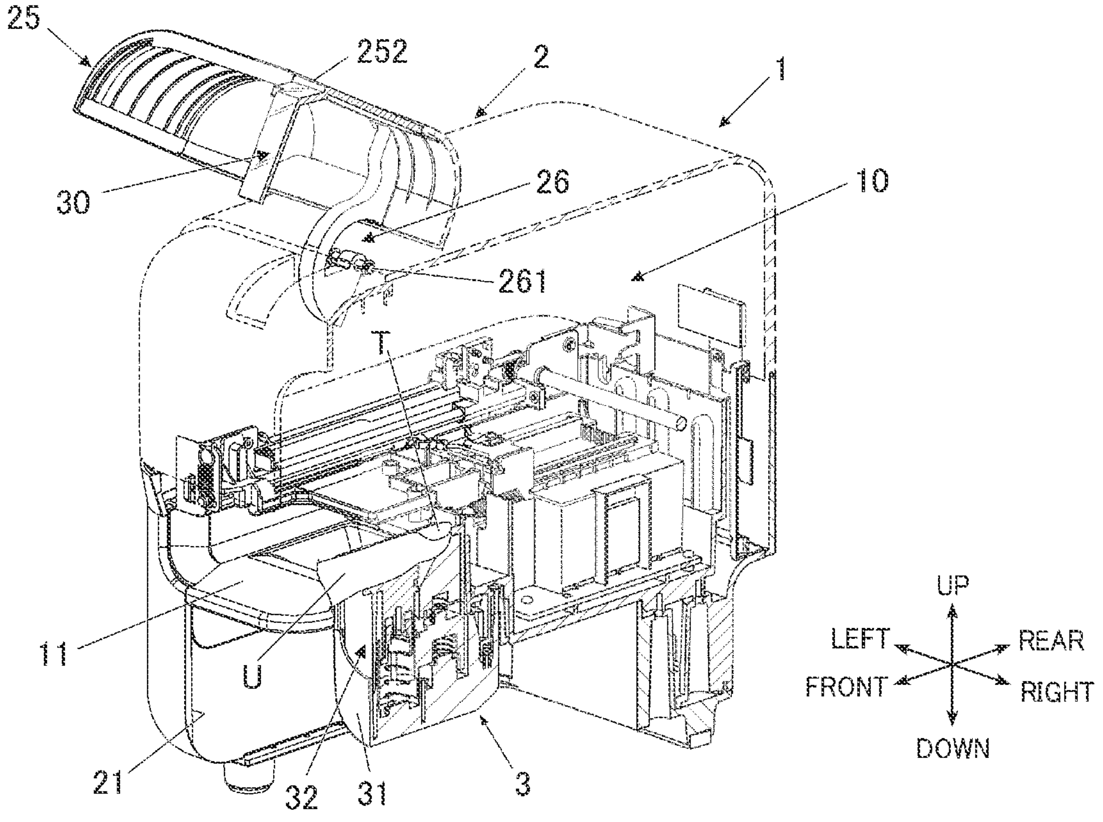
FIG. 5 is a cross-sectional perspective view along the V-V line of the printing device in the open state shown in FIG. 2.

FIG. 3 is a cross-sectional view along the III-III line of the printing device in the closed state shown in FIG. 1. FIG. 4 is a cross-sectional perspective view along the III-III line of the printing device shown in FIG. 1. FIG. 5 is a cross-sectional perspective view along the V-V line of the printing device in the open state shown in FIG. 2.

Though FIGS. 1 and 2 show the state in which the finger is not placed on the finger stage, whereas FIGS. 3 to 5 show the state in which the finger is placed on the finger stage. FIGS. 3 to 5 omit the illustration of part of the configuration in the housing.

In the following embodiment, the up, down, left, right, front and rear refer to the directions shown in FIG. 1. The X, and Y directions refer to the directions shown in FIG. 1.

As shown in FIG. 1, the printing device 1 has a housing 2 which is almost box-shaped.

An opening 21 is formed over almost the entire surface in the left-right direction (horizontal direction of the printing device 1, left-right direction and X direction in FIG. 1) in the lower section on the front surface side (front surface side of the printing device 1, front side in FIG. 1) of the housing 2 (housing body 20). The upper section on the front surface side of the housing 2 (housing body 20) is a front wall 22, and a cut portion 23 is formed continuously above the opening 21 in the nearly central portion in the left-right direction of the housing 2 of the front wall 22. The cut portion 23 functions as an entrance and exit for attaching and removing a print head 41 to and from the device, as described below.

The housing 2 has a front cover 25 which covers the cut portion 23.

The front cover 25 is joined rotatably to the housing body 20 via a hinge mechanism 26 provided at the upper end of the front wall 22 or the front end of the upper surface (top plate) of the housing body 20, for example.

To be specific, the front cover 25 is rotatable from the closed state (state shown in FIGS. 1, 3 and 4) of covering the front surface side of the front wall 22 of the housing body 20 to the open state (state shown in FIGS. 2 and 5) in which the front surface side of the hosing body 20 is open (in the embodiment, the front wall 22 including the cut portion 23 is exposed), around the rotation axis 261 of the hinge mechanism 26.

A window portion 251 is provided at the nearly central portion in the left-right direction of the housing 2 in the front cover 25. A window member 252 made of transparent or translucent resin or the like is fitted into this window portion 251. This allows the user to visually check the inside of the device from the outside through the window member 252 even when the front cover 25 is closed.

In the embodiment, there is provided a tongue 30 that is connected to the window member 252 and formed in a nearly L-shape with the tip side (free end side) extending toward the inside of the device.

The tongue 30 functions as a holder that is able to move to at least first position and second position. The first position is the position where the movement of the finger U is restricted. The second position is the position where the distance to an after-mentioned rest 32 is larger than the first position and the restriction on the finger U is removed.

When the front cover 25 comes to the closed state, the tongue 30 in the embodiment is placed at the first position where the tongue 30 contacts the upper surface of the finger U placed on an after-mentioned finger stage 3 to hold the upper surface of the finger U from above and restricts the position in the height direction of the finger U. When the front cover 25 comes to the open state, the tongue 30 leaves the upper surface of the finger U and is placed at the second position where the restriction on the finger U is removed.

The tongue 30 which functions as the holder restricts the height of the finger U so that the nail T is placed at the suitable height position for printing (that is, the distance between the surface of the nail T and the ink discharge surface of the print head 41, not shown, is neither too close nor too far). At the first position, the tongue 30 is set to prevent the finger U from rising from the appropriate height position by contacting the upper surface of the finger U, and retain the appropriate height.

The tongue 30 may be made of the same material as the window member 252 and formed with the window member 252 in one piece, or the tongue 30 may be attached to the lower end of the window member 252 as a separate member.

In the embodiment, FIG. 2, for example, shows a case where the tongue 30 is also a transparent or translucent member similarly to the window member 252. However, in the case where the tongue 30 is formed as a separate member from the window member 252, the tongue 30 is not limited to the transparent or translucent member, but may be an opaque resin plate or the like.

The size in the width direction, thickness and the like of the tongue 30 are not especially limited as long as the tongue 30 contacts the upper surface of the finger U placed on the finger stage 3 and can define the position (mainly, position in the height direction or Z-axis direction) of the finger U. When the width is extremely narrow, it is difficult to stably contact the upper surface of the finger U. On the other hand, when the width is extremely wide, the tongue 30 may interfere with surrounding structures when moving from the first position to the second position, from the second position to the first position, and the like. Thus, the tongue 30 is preferably about the same width dimension as the finger stage 3.

If the tip (free end) of the tongue 30 is extremely long, when the front cover 25 is rotated, the tip of the tongue 30 butts against the finger U placed on the finger stage 3 or the like before the front cover 25 is completely closed, and thus the tongue 30 cannot be lowered to the sufficient height position.

Thus, in the embodiment, the tongue 30 has a length up to the front side in the finger inserting direction of the position directly below (shown with the single dotted line in FIG. 3) the rotation shaft 261 (rotation axis of the rotation of front cover 25) of the hinge mechanism 26 configured to rotate the front cover 25. The tongue 30 is set not to be provided longer than this to the back of the device. This prevents the tip of the tongue 30 from butting against the finger U in the process of rotating the front cover 25 and completely closing the front cover 25.

An operation unit 27 of the printing device 1 is provided on the upper surface (top plate) of the housing 2. The operation unit 27 is, for example, an operation button (power switch button) to turn on/off the power of the printing device 1. When the operation unit 27 is operated, the operation signal is output to a controller not shown in the drawings. The controller performs control according to the operation signal, and operates the components of the printing device 1. For example, when the operation unit 27 is the power switch button, the printing device 1 is turned on/off according to the button operation. When the printing device 1 operates in cooperation with external various portable terminal devices (hereinafter, referred to as "external device"), the components of the printing device 1 may operate in accordance with the operation signal input from the operation unit of the external device instead of or in addition to the operation unit 27.

The external configuration of the printing device 1, each shape and arrangement of the components in the housing 2, and the like are not limited to the illustrated example, and may be appropriately set. For example, the operation unit 27 may be provided not on the upper surface but on the lateral surface, back surface or the like of the housing 2. The housing 2 may have other various operation buttons as the operation unit 27, and various displays, indicators and the like.

A device body 10 including a base 11 is housed inside the housing 2.

The finger stage 3 is arranged in the nearly central portion in the left-right direction (X direction) on the device front surface side in the base 11.

The finger stage 3 in the embodiment includes a case 31 and a rest 32 placed in the case 31. The rest 32 presses up and supports the finger U placed on the finger stage 3, from the lower side (that is, belly side of the finger U). In the rest 32, at least the portion directly contacting the finger U is preferably formed of flexible materials such as various resins.

The finger stage 3 (rest 32 of the finger stage 3) is open on the upper side, and the tongue 30 is only arranged up to the front side, in the inserting direction of the finger U, of the nail T as shown in FIG. 3. Thus, the nail T of the finger U placed on the rest 32 is exposed. Thus, the nail T of the finger U placed on the rest 32 is retained in such a way that the nail T can be photographed by a camera not shown in the drawings of the photographing unit 5 and printed by a printing unit 4.

The rest 32 in the embodiment is configured by having multiple members (first member 321, second member 322, and third member 323) which are arranged to be connected to each other along the inserting direction of the finger U and each of which can move up and down (see FIG. 3).

To be specific, the first member 321 is arranged on the relatively front side in the finger inserting direction (front-rear direction), the second member 322 is arranged on the relatively back side (backmost in the embodiment) in the finger inserting direction, and the third member 323 is arranged between the first member 321 and the second member 322.

The first member 321 includes a member body 321*a* and a biasing member 321*b* which biases the member body 321*a* upward.

The upper surface of the member body 321*a* is a nearly V-shaped inclined surface becoming lower from both sides toward the center along the left-right direction, and prevents the finger U from rattling to the left and right when the finger U is placed.

The second member 322 is integrated with the third member 323 so as to sandwich the third member 323. The second member 322 includes a member body 322*a* and a biasing member 322*b* which biases the member body 322*a* upward.

The member body 322*a* is engaged with the member body 321*a* of the first member 321. When the first member 321 is pushed down, the position of the member body 322*a* of the second member 322 (and the member body 323*a* of the third member 323) is also lowered.

The third member 323 includes a member body 323*a* and a biasing member 323*b* which biases the member body 323*a* upward.

The member body 323*a* is inclined to be gradually higher from the front side toward the back side in the finger inserting direction. The backmost portion is a nail rest 33 which supports the nail tip (or the finger tip). A coil spring, for example, is applied as each of the biasing member 321*b* of the first member 321, the biasing member 322*b* of the second member 322 and the biasing member 323*b* of the third member 323, but the biases are not limited to the coil springs.

The printing unit 4 (see FIG. 2), the photographing unit 5 (see FIG. 1), and the like are assembled in the device body 10.

The printing unit 4 performs printing on the nail T to be printed, and includes a print head 41 as a printer, a moving mechanism (not shown in the drawings) which moves the print head 41 as appropriate, and the like.

Though the configuration of the print head 41 is not particularly limited, the print head 41 is, for example, a cartridge-integrated head in which the storing section (ink cartridge) to store the ink and the discharge section (neither of them shown in the drawings) are formed in one piece. The specific configuration to discharge ink from the discharge section may adopt any method and not particularly limited.

In the embodiment, the discharge surface (ink discharge surface, not shown in the drawings) which has the discharge port of nozzle to discharge the ink (liquid agent) is formed on the lower surface (surface facing the surface of nail T placed on the rest 32) of the print head 41. The print head 41 is an inkjet type head which performs printing by spraying the micro droplets of the ink from the discharge surface to the printing target surface (nail surface).

The ink stored in the print head 41 is, for example, inks of various colors (hereinafter, referred to as "color inks") such as cyan (C), magenta (M), and yellow (Y). The ink discharged from the print head 41 is not limited to this, and the ink of other colors may be discharged. The print head 41 is not limited to the print head which discharges color inks, and may be a print head which discharges liquid agent (ink for the base of white or the like) which serves as the base before printing of the design, for example. The printing device 1 may have any single print head 41 or may have multiple print heads 41.

The print head 41 is retained to be attachable to and detachable from a print head holder 42 (see FIG. 2).

In the embodiment, the print head 41 retained in the print head holder 42 is loaded on a carriage (not shown in the drawings) extending over the X-direction of the device, so as to be movable in the XY direction on the base 11.

To be specific, a moving mechanism (not shown in the drawings) which moves the print head 41 includes an X-direction moving mechanism which includes an X-direction moving motor (not shown in the drawings) and moves the print head 41 in the X direction in the carriage, and a Y-direction moving mechanism which includes a Y-direction moving motor (not shown in the drawings) and moves, in the Y direction, the carriage with the print head 41 loaded thereon.

The photographing unit 5 includes a camera, a light source, and the like (not shown in the drawings). For example, the photographing unit 5 is attached to the inner side of the top surface of the housing 2, the supporting member (not shown in the drawings) vertically provided to the device body, or the like. As shown in FIG. 1, the photographing unit 5 is placed above the finger stage 3, and able to photograph the nail T of the finer U placed on the rest 32.

Though not shown in the drawings, the printing device 1 is equipped with a control device which is configured by including a controller, a storage and the like. The controller and the like are mounted on substrate and the like (not shown in the drawings) arranged on the inner side (lower surface side) of the upper surface (top plate) of the housing 2, for example.

The controller is configured by including at least one processor such as a CPU (Central Processing Unit) not shown in the drawings, for example. The storage is configured by including a ROM (Read Only Memory), a RAM (Random Access Memory) and the like (none of them shown in the drawings).

The storage stores the printing program for performing the printing process and various programs for operating the printing device 1, for example. The controller loads these programs to the working area of the RAM, executes the program in the controller and thus integrally controls the components of the printing device 1, for example. The control device including the controller and the storage is a computer which achieves various functions by the cooperation between the controller and the program stored in the storage.

Next, the action of the printing device in the embodiment is described.

While the printing device 1 is stored, the printing device 1 is in the closed state in which the front cover 25 covers the front wall 22 as shown in FIG. 1.

When printing is performed to the nail T by using the printing device 1, the printing device 1 comes to the open state as shown in FIG. 2 by rotating the front cover 25 from the closed state as shown in FIG. 1.

The configuration to move the front cover 25 from the closed state to the open state is not particularly limited, and the user may manually rotate the front cover 25, for example. When the hinge mechanism 26 includes a motor for the rotation operation, the front cover 25 may automatically rotate in the upper direction (direction shown by the arrow in FIG. 2) to come to the open state when the device is turned on by the operation of the operation unit 27, for example. Furthermore, when there is an operation button to open the front cover 25, the user may be urged with display, sound or the like, to operate the operation button.

When the front cover 25 comes to the open state, the user places the finger U corresponding to the nail T to be printed on the rest 32 of the finger stage 3.

For example, in the case where the printing device 1 cooperates with an external device not shown in the drawings, the external device in cooperation (for example, a portable terminal device) may have a display or the like display an instruction screen, a guidance screen or the like urging the user to place the finger U on the rest 32 of the finger stage 3. When the printing device 1 or the external device has a speaker or the like, a message may be provided with audio guidance to urge the user to place the finger U on the rest 32.

For example, when the base is applied to the nail T, dried and then various designs are printed, the user places the finger U corresponding to the nail T to which the base is applied, on the rest 32 of the finger stage 3. Since the finger stage 3 in the embodiment is open on the upper side, the user does not particularly need to push down the rest 32, and may merely place the finger U on the rest 32.

When the finger U is placed on the rest 32 (see FIG. 5), the front cover 25 is rotated (rotated in the opposite direction to the arrow shown in FIG. 2) again around the rotation shaft 261 of the hinge mechanism 26, and comes to the closed state (see FIGS. 3 and 4).

The timing to make the front cover 25 in the closed state is, for example, when the user places the finger U on the rest 32 and inputs the instruction to start printing from the operation unit 27. The front cover 25 may be rotated manually or automatically.

When the front cover 25 is rotated automatically, for example, the placement of the finger U (nail T of the finger U) on the rest 32 may be recognized by image analysis of the image obtained by the camera of the photographing unit 5, and in response to this recognition result, a driver (for example, motor not shown in the drawings) for rotating the rotation shaft 261 of the hinge mechanism 26 may be operated in the direction of closing the front cover 25.

Thereby, the tongue 30 which functions as the holder is arranged at the first position which is the position to restrict the movement (especially, rise in the upper direction) of the finger U.

The finger U placed on the rest 32 is biased upward by the biasing member **321*b* of the first member 321, the biasing member 322*b* of the second member 322, and the biasing member 323*b* of the third member 323. Thus, the upper surface of the finger U may be positioned at the position higher than the position which is originally suitable for printing (that is, the position that is neither too close nor too far from the ink discharge surface of the print head 41**). Especially in the case of the user having an extremely high (thick) finger, the tendency for the upper surface of the finger U to be too high becomes prominent.

Even in such case, when the front cover 25 is made closed state, the tongue 30 which functions as the holder moves while slightly pushing down the upper surface of the finger U (while slightly pushing down the rest 32 together with the finger U). Thus, in the state in which the tongue 30 is placed at the first position, the upper surface of the finger U is placed at the height position allowing the nail T to be placed at the suitable position for the printing, and at this position, the lower surface of the tongue 30 maintains the state of contacting the upper surface of the finger U, and defines the height position of the finger U.

The printing process on the nail T is performed with the front cover 25 in the closed state, in which the tongue 30 is placed at the first position.

As the printing process, the finger U including the nail T is photographed with the camera of the photographing unit 5 to obtain the nail image, and the nail outline defining the region of nail T is detected from the nail image.

When the nail outline is detected, the design desired by the user is fitted into the range of nail outline by the controller or the like, and necessary corrections and the like are performed as appropriate to generate data for printing (printing data). Furthermore, the printing unit 4 operates according to the printing data, and the design is printed on the nail T.

In the case where the print head 41 in the printing device 1 does not print a design but prints a base by using white liquid agent (base ink) or the like, the flow of the generation of printing data from the detection of the nail outline and the printing operation based on the printing data is same as the flow of printing the design. The process from the detection of nail outline to the generation of the printing data may be performed by the controller of the printing device 1 or by the controller of the external device in cooperation.

When the printing operation has been finished, the front cover 25 is again rotated (rotated in the arrow direction shown in FIG. 2) around the rotation shaft 261 of the hinge mechanism 26, to put the front cover 25 into the open state (see FIGS. 2 and 5).

The timing to put the front cover 25 into the open state is, for example, when the controller determines that the printing on the nail T has been finished. In the case where the hinge mechanism 26 includes a motor or the like for rotating operation, when the controller determines that printing has been finished, the controller automatically opens the front cover 25.

Also in this case, for example, the controller may recognize that the printing on the nail T of the finger U on the rest 32 has been completed by analyzing the image obtained by the camera of the photographing unit 5, and in response to the recognition result, the controller may operate the motor or the like so as to rotate the rotation shaft 261 of the hinge mechanism 26 in the direction of opening the front cover 25.

The opening of the front cover 25 is not limited to the case of automatic opening.

For example, in the case where the printing device 1 cooperates with the external device not shown in the drawings, the controller may cause a display of the terminal device in cooperation to display an instruction screen to urge the user to open the front cover 25 or output the audio message, and thereby cause the user to manually open the front cover 25 or, in the case where an operation button to open the front cover 25 is provided, urge the user to operate the button.

A display or the like of the external device (for example, terminal device) in cooperation may display in advance that the front cover 25 is about to open, to caution the user not to move the finger U until the front cover 25 is opened.

The printing device 1 may have a configuration that the front cover 25 is in the locked state so as not to be opened during the printing process.

As the front cover 25 opens while rotating, the controller may guide the action when pulling out the finger U, by causing the display or the like to instruct to remove the finger U from the finger stage 3 in accordance with the movement of the front cover 25. To be specific, there is a possibility that the nail T hits the front cover 25 and the tongue 30 when the finger U is moved upward after printing. Thus, for example, the controller may instruct, by figures or the like, the user to pull the finger U diagonally upward toward the front side along the orbit of movement of the front cover 25.

When the front cover 25 is opened in this way, the tongue 30 which functions as the holder also accordingly changes from the state of holding the upper surface of the finger U (that is, the state in which the tongue 30 is placed at the first position) to the state of removing the restriction on the finger U (that is, the state in which the tongue 30 is placed at the second position), leaving a large space above the finger U and the nail T.

Thus, there is no risk of the nail T after printing hitting or rubbing against surrounding materials, and the nail T can be removed from the device while maintaining high quality printing.

As descried above, the printing device 1 in the embodiment includes a print head 41 as a printer which prints on a nail T to be printed, a rest 32 on which a finger U corresponding to the nail T is placed, and a tongue 30 as a holder which can move to at least a first position and a second position. The first position is a position where the movement of the finger U is restricted. The second position is a position where the distance to the rest 32 is larger than the first position and the restriction on the finger U is removed. The tongue 30 is placed at the first position at least when the printing operation by the print head 41 is performed.

Thus, when the front cover 25 is opened and the tongue 30 as the holder is placed at the second position after printing, a large space is left above the finger U and the nail T. Thus, there is no risk of the nail T after printing hitting or rubbing against surrounding materials, and the nail T can be removed from the device while maintaining high quality printing.

In the embodiment, the tongue 30 as the holder holds the upper surface of the finger U from above when the tongue 30 is placed at the first position. The biases (biasing member **321*b*, biasing member 322*b*, and biasing member 323*b*) which bias the rest 32** upward are provided.

Thus, when the user places the finger U on the rest 32, the finger simply needs to be placed without any particular pushing-down action or the like by the user, and it is also possible to prevent, by the biases, the finger U from extremely sinking downward. When the user places the finger U on the rest 32, there is no holder covering the upper side of the finger U. Thus, for example, when the user intends to print a design by setting, in the printing device 1, the nail on which the base has been already coated, there is no risk of hurting the nail surface compared to the case of inserting the finger into the space surrounded in the frame form. Then, when the tongue 30 is placed at the first position, the finger U is restricted to an appropriate height position by holding of the upper surface of the finger U from above, and the state in which the nail T is held at the height position suitable for printing is maintained during the printing operation. Thus, it is possible to perform high quality printing.

In the embodiment, the printing device 1 includes a housing 2 which houses a device body 10. The tongue 30 as the holder is provided to the front cover 25 which is the rotating member in the housing 2, and configured to be able to move to the first position and the second position by rotation of the front cover 25.

In such a way, by merely providing the tongue 30 as the holder to the front cover 25 which rotates, the height of the finger U is restricted by the tongue 30 in the state in which the front cover 25 is closed to perform the printing operation, and the finger U can be freely inserted and removed in the state in which the front cover 25 is open. Thus, it is possible to prevent the nail T from contacting the surrounding materials and the like before and after printing while retaining the finger U at the appropriate position during printing.

The holder may be configured to automatically move between the first position and the second position by a motor or the like as a driver. In this case, a camera of the photographing unit 5 or the like may function as a detector which can detect states of the nail T and the finger U, and the driver such as the motor may automatically move the holder on the basis of the detection result of the detector (for example, image photographed by the camera).

In this case, it is possible to automatically switch to the appropriate state without the user having to change the position of the holder according to the state in which the finger U and the nail T are placed.

Though the embodiment of the present disclosure has been described above, the present disclosure is not limited to the embodiment, and various modifications can be made within the scope of the present disclosure.

For example, the shape, configuration and the like of the tongue 30 as the holder are not limited to the illustrated example.

The tongue 30 as the holder may have a cushioning member 302 on at least the surface which contacts the finger U when the tongue 30 is at the first position.

Figure 6:
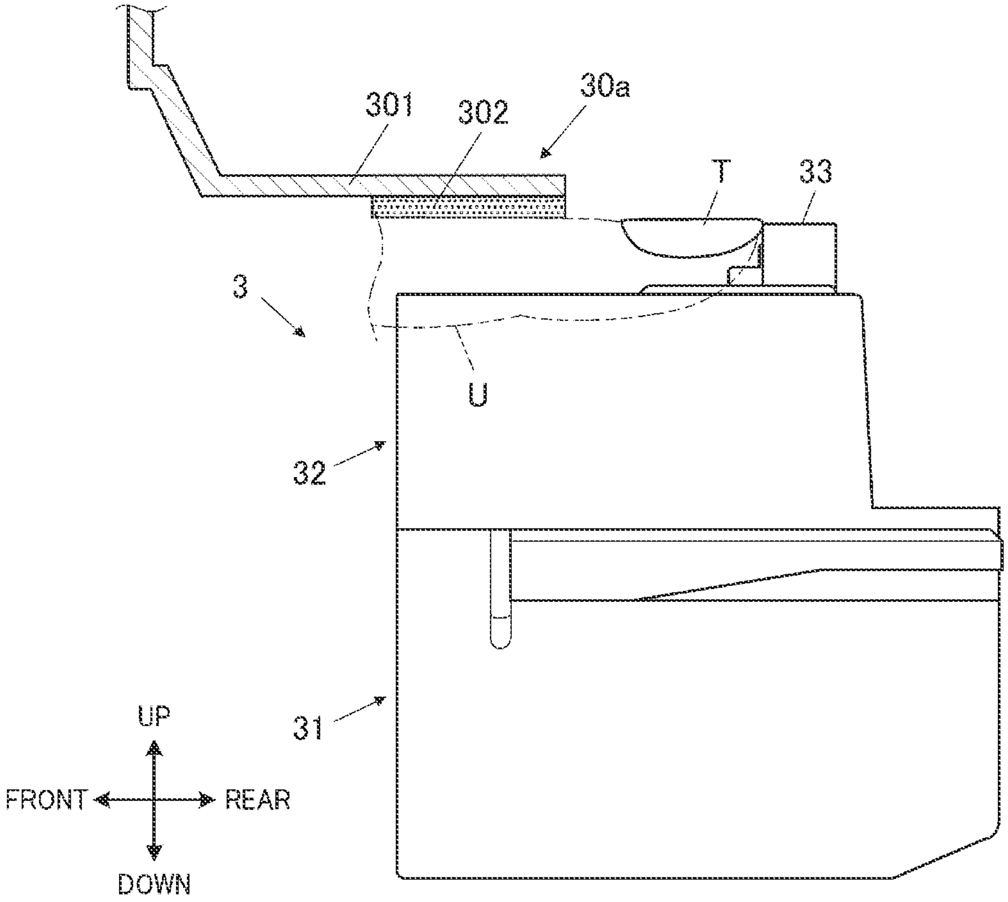
FIG. 6 is a schematic view showing the positional relationship between a lateral view of a finger stage on which a finger is placed and a cross-section of a modification example of a tongue.

For example, FIG. 6 shows a case where the tongue **30*a* includes a tongue body 301 connected from the window member 252, and a cushioning member 302 which is arranged on the lower side surface of the tongue body 301 (that is, the surface on the side contacting the finger U). The method for providing the cushioning member 302 on the lower side surface of the tongue body 301** is not particularly limited. For example, various methods such as adhesion by various adhesives and double-sided tapes and screw fixation can be used.

As the cushioning member 302, urethane resin can be applied, for example. However, the cushioning member 302 is not limited to this, and various resins can be used.

This reduces the burden on the user's finger U by suppressing the shock and the like applied to the finger U when the tongue **30*a*** contacts the upper surface of the finger U.

In the tongue **30*b* as the holder, at least the portion which is placed on the finger U when the tongue 30*b* is placed at the first position may be a cushioning portion 303** formed of a flexible material.

Figure 7A:
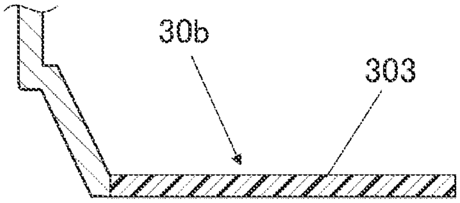
FIG. 7A is a cross-sectional view of a modification example of the tongue.

For example, FIG. 7A shows a case where the tongue **30*b* is a cushioning portion 303 formed of a flexible material such as various resin materials, which is different from the material forming the window member 252. Thus, when the tongue 30*b*** contacts the upper surface of the finger U, it is possible to suppress the shock applied to the finger U and the like and reduce the burden on the user's finger U.

Figure 7B:
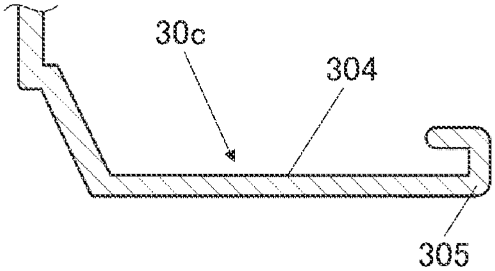
FIG. 7B is a cross-sectional view of a modification example of the tongue.

As shown in FIG. 7B, the end portion 305 on the free-end side of the tongue body 304 in the tongue 30*c* as the holder may be in a round shape.

In this case, the shape of the end portion 305 is not limited to the illustrated example, and the end portion 305 may be shaped to prevent hitting or rubbing against the upper surface of the finger U when the tongue 30*c* moves from the first position to the second position and from the second position to the first position.

Such shape can reduce the burden on the user's finger U.

Though the embodiment shows a case where the tongue 30 is connected to the window member 252 provided in the front cover 25 of the housing 2, the holder is not limited to the case of being provided to the housing 2.

The holder may be movable to the first position where the movement of the finger U is restricted and the second position where the distance to the rest 32 is larger than the first position.

Figure 8:
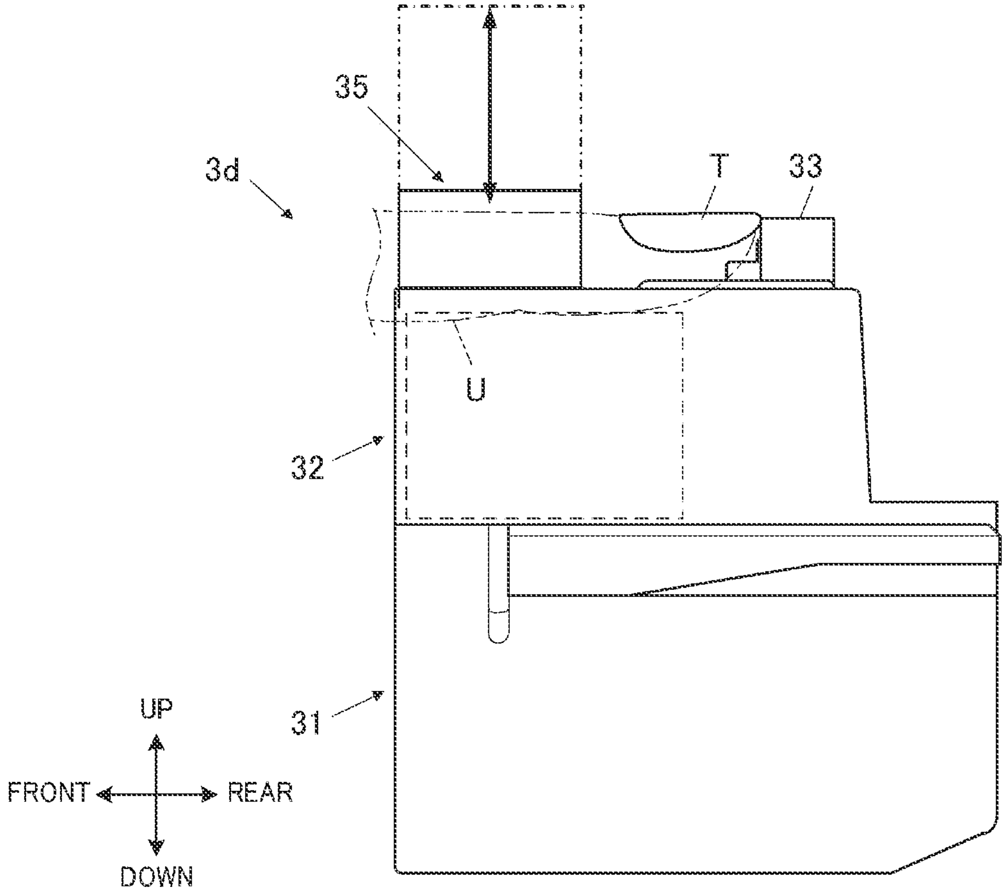
FIG. 8 is a lateral view showing a modification example of the finger stage on which the finger is placed.

For example, as shown in FIG. 8, the finger stage 3*b* including the rest 32 may include a holder 35 provided to be movable up and down.

In this case, the holder 35 is, for example, a frame member which is provided to surround the finger U placed on the rest 32. The inner side of the top surface thereof contacts the upper surface of the finger U and restricts the height position of the finger U. The state in which the holder 35 contacts the upper surface of the finger U is the state of being placed at the first position (state shown by the solid line in FIG. 8). The state changes to the state of being placed at the second position by at least the portion contacting the upper surface of the finger U rising from the first position (state shown by single dotted line in FIG. 8).

By having such a configuration, it is possible to realize the configuration that the holder can be placed at the first position and at the second position where the distance to the rest 32 is larger than the first position, without changing the shape of the housing 2.

Also in this case, in the state in which the holder is placed at the second position, a large space is left above the finger U and the nail T. Thus, there is no risk of the nail T after printing hitting or rubbing against surrounding materials, and the nail T after printing can be removed from the device while maintaining high quality printing.

Though not shown in the drawings, the housing 2 may have a holder provided to be movable up and down. In this case, it is not necessary to provide the rotatable front cover 25, hinge mechanism 26 and the like to the housing 2, and a mechanism to move the holder up and down is provided instead.

Both in the case of providing the holder 35 which is movable up and down to the finger stage 3*b* including the rest 32 and in the case of providing the holder which is movable up and down to the housing 2, the holder may be moved up and down manually or automatically.

In the case where the holder is moved up and down manually, for example, a pinch or grip is provided on the holder, which is grasped by a finger U or the like, and slid up and down like a shutter. The details of the specific configurations and operations are not limited to those shown here.

In the case where the holder is moved up and down automatically, for example, the placement of the finger U (nail T of the finger U) on the rest 32 may be recognized by image analysis of the image obtained by the camera of the photographing unit 5, and in response to this recognition result, a driver (for example, motor not shown in the drawings) may be operated in the direction of lowering the holder. For example, when the completion of printing on the nail T of the finger U on the rest 32 is recognized by image analysis of the image obtained by the camera of the photographing unit 5, in response to this recognition result, the motor or the like may be operated in the direction of raising the holder.

Figure 9:
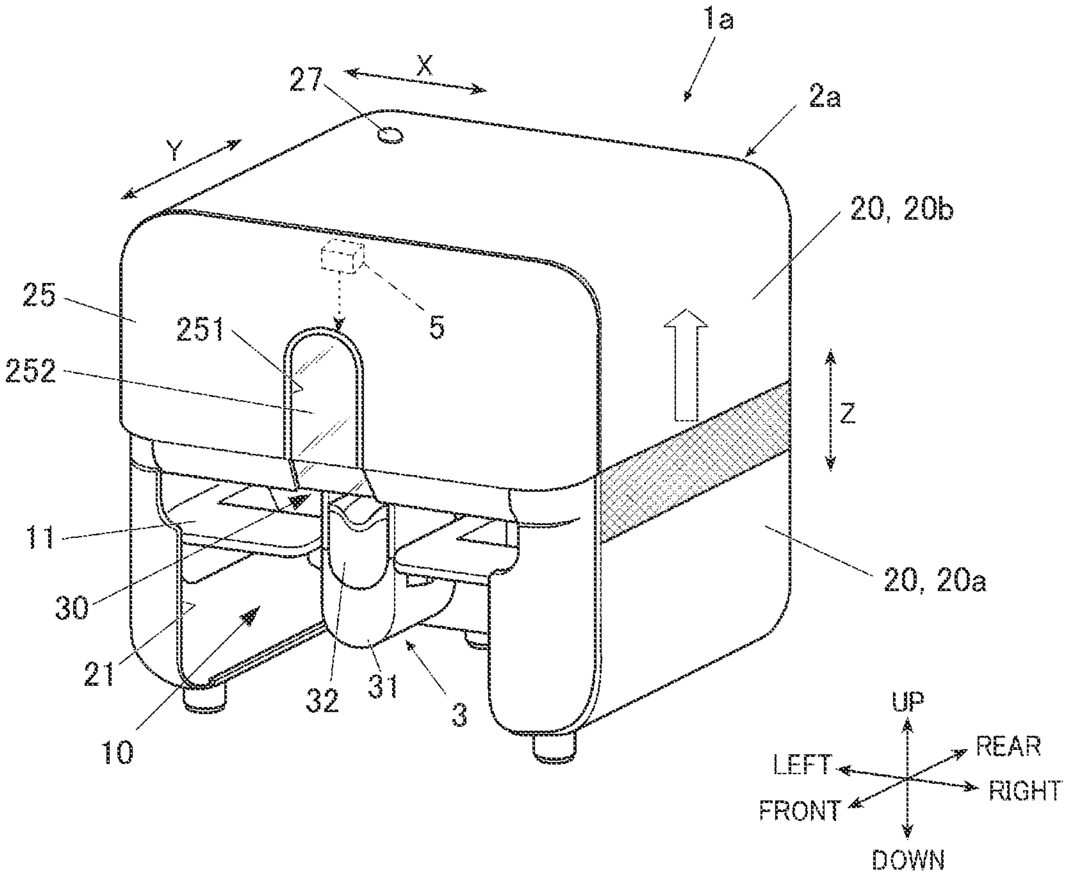
FIG. 9 is a main part perspective view showing the external configuration of the printing device in a modification example.

Furthermore, as shown in FIG. 9, in a printing device 1*a*, a housing 2*a* which houses the device body 10 may include a housing body 20*a* and a lid 20*b* which is attachable to and detachable from the housing body 20*a*, and the tongue 30 as the holder may be provided to the lid 20*b*.

In this case, the tongue 30 is placed at the first position when the lid 20*b* is attached to the housing body 20*a* (that is, the state shown in FIG. 9). The tongue 30 is placed at the second position when the lid 20*b* is removed in the direction shown by the white arrow in FIG. 9 from the housing body 20*a*.

By this, only by attaching and detaching the lid 20*b*, it is possible to have the state in which the height of the finger U is restricted by the tongue 30 and the state in which the finger U can be freely inserted and removed.

Also in this case, in the state in which the holder is placed at the second position, a large space is left above the finger U and the nail T. Thus, there is no risk of the nail T after printing hitting or rubbing against surrounding materials, and the nail T can be removed from the device while maintaining high quality printing.

In the embodiment, an inkjet type print head 41 is provided as the print head 41 of the printing device 1. However, the configuration of the print head 41 is not limited to this.

There may be provided a syringe-type head, pen-type head, or other configuration different from the inkjet type print head 41.

The embodiment takes, as an example, a case where the printing device 1 cooperates with the external device such as the terminal device to prints on the nail. However, the printing device 1 is not limited the example shown here. The printing device 1 may be configured to complete the printing operation by itself.

For example, the embodiment shows a case where various instruction screens are displayed on the display of the external device. However, the printing device 1 may have a display, and in this case, a touch panel may be integrally provided to the display. In the case where the printing device 1 includes a touch panel, the touch panel may function as the operation unit 27.

Although several embodiments of the present disclosure have been described, the scope of the present disclosure is not limited to the above described embodiments and includes the scope of the present disclosure that is described in the claims and the equivalents thereof.

What is claimed is:

1. A printing device comprising:

a rest on which a finger corresponding to a nail to be printed is placed;

a housing which houses a device body; and a holder which is movable to at least a first position and a second position by rotation of a rotator provided in the housing, wherein the first position is a position where a movement of the finger placed on the rest is restricted, and the second position is a position where a distance to the rest is larger than the first position and restriction on the finger is removed, and wherein when the holder is located at the first position, the holder is formed in an L-shape with a free end side extending toward a back side in a finger inserting direction.

2. The printing device according to claim 1, further comprising a print head which prints on the nail, wherein the holder is placed at the first position at least when a printing operation by the print head is performed.

3. The printing device according to claim 2, wherein the rest includes a bias which biases the rest upward, and the movement of the finger is restricted by the holder pushing down the finger and the rest from above when the holder moves from the second position to the first position and further by the bias biasing the rest upward.

4. The printing device according to claim 2, further comprising a housing which houses a device body and includes a lid that is detachable from the printing device, wherein the holder is provided at the lid, and the holder is placed at the first position when the lid is attached to a housing body, and the holder is placed at the second position when the lid is removed from the housing body.

5. The printing device according to claim 2, wherein the holder is provided to a finger stage including the rest or a housing so as to be movable up and down, and the holder is placed at the second position by rising from a state of being placed at the first position.

6. The printing device according to claim 2, further comprising:
a driver which is able to move the holder between the first position and the second position; and
a detector which is able to detect a state of the nail and the finger, wherein
the driver moves the holder based on a detection result of the detector.

7. The printing device according to claim 1, wherein the rest includes a bias which biases the rest upward, and the movement of the finger is restricted by the holder pushing down the finger and the rest from above when the holder moves from the second position to the first position and further by the bias biasing the rest upward.

8. The printing device according to claim 7, further comprising a housing which houses a device body and includes a lid that is detachable from the printing device, wherein the holder is provided at the lid, and the holder is placed at the first position when the lid is attached to a housing body, and the holder is placed at the second position when the lid is removed from the housing body.

9. The printing device according to claim 7, wherein the holder is provided to a finger stage including the rest or a housing so as to be movable up and down, and the holder is placed at the second position by rising from a state of being placed at the first position.

10. The printing device according to claim 7, further comprising:
a driver which is able to move the holder between the first position and the second position; and
a detector which is able to detect a state of the nail and the finger, wherein
the driver moves the holder based on a detection result of the detector.

11. The printing device according to claim 1, further comprising a housing which houses a device body and includes a lid that is detachable from the printing device, wherein the holder is provided at the lid, and the holder is placed at the first position when the lid is attached to a housing body, and the holder is placed at the second position when the lid is removed from the housing body.

12. The printing device according to claim 11, further comprising:
a driver which is able to move the holder between the first position and the second position; and
a detector which is able to detect a state of the nail and the finger, wherein
the driver moves the holder based on a detection result of the detector.

13. The printing device according to claim 1, wherein the holder is provided to a finger stage including the rest or a housing so as to be movable up and down, and the holder is placed at the second position by rising from a state of being placed at the first position.

14. The printing device according to claim 13, further comprising:
a driver which is able to move the holder between the first position and the second position; and
a detector which is able to detect a state of the nail and the finger, wherein
the driver moves the holder based on a detection result of the detector.

15. The printing device according to claim 1, further comprising:
a driver which is able to move the holder between the first position and the second position; and
a detector which is able to detect a state of the nail and the finger, wherein
the driver moves the holder based on a detection result of the detector.

16. The printing device according to claim 1, further comprising:
a driver which is able to move the holder between the first position and the second position; and
a detector which is able to detect a state of the nail and the finger, wherein
the driver moves the holder based on a detection result of the detector.

17. The printing device according to claim 1, wherein an end on the free end side of the holder when the holder is located at the first position is located on a front side in the finger inserting direction of a position directly below a rotation shaft of the rotator.

* * * * *